April 3, 1962     A. C. KOELSCH, JR., ETAL     3,027,806
ELECTRO-OPTICAL DEVICES Filed March 14, 1957     4 Sheets-Sheet 1

INVENTORS
ALBERT C. KOELSCH
DONALD R. YOUNG
BY John E. Dougherty Jr.
ATTORNEY

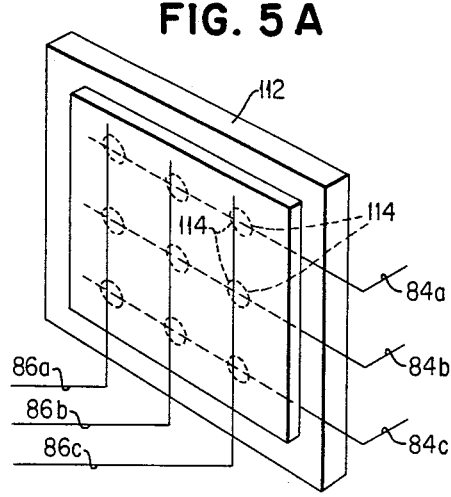
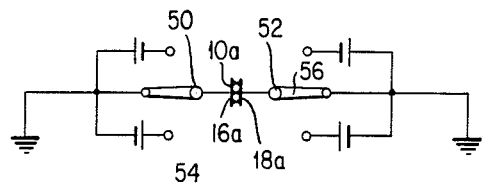
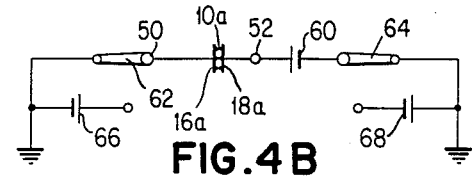
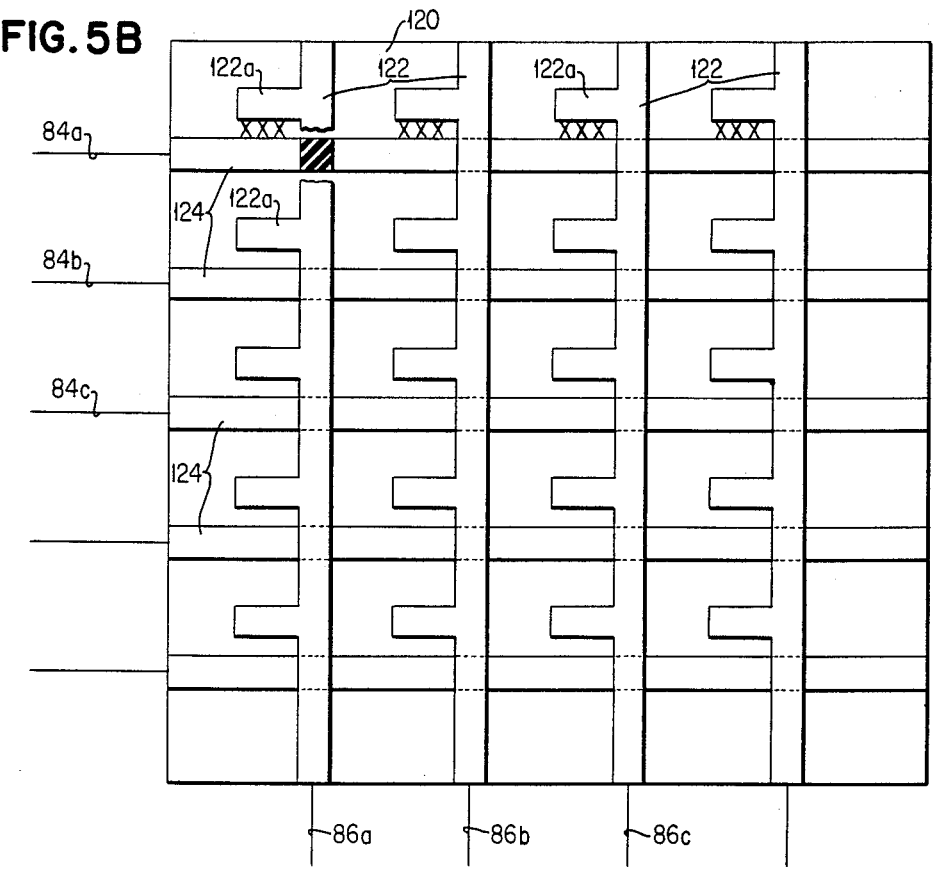

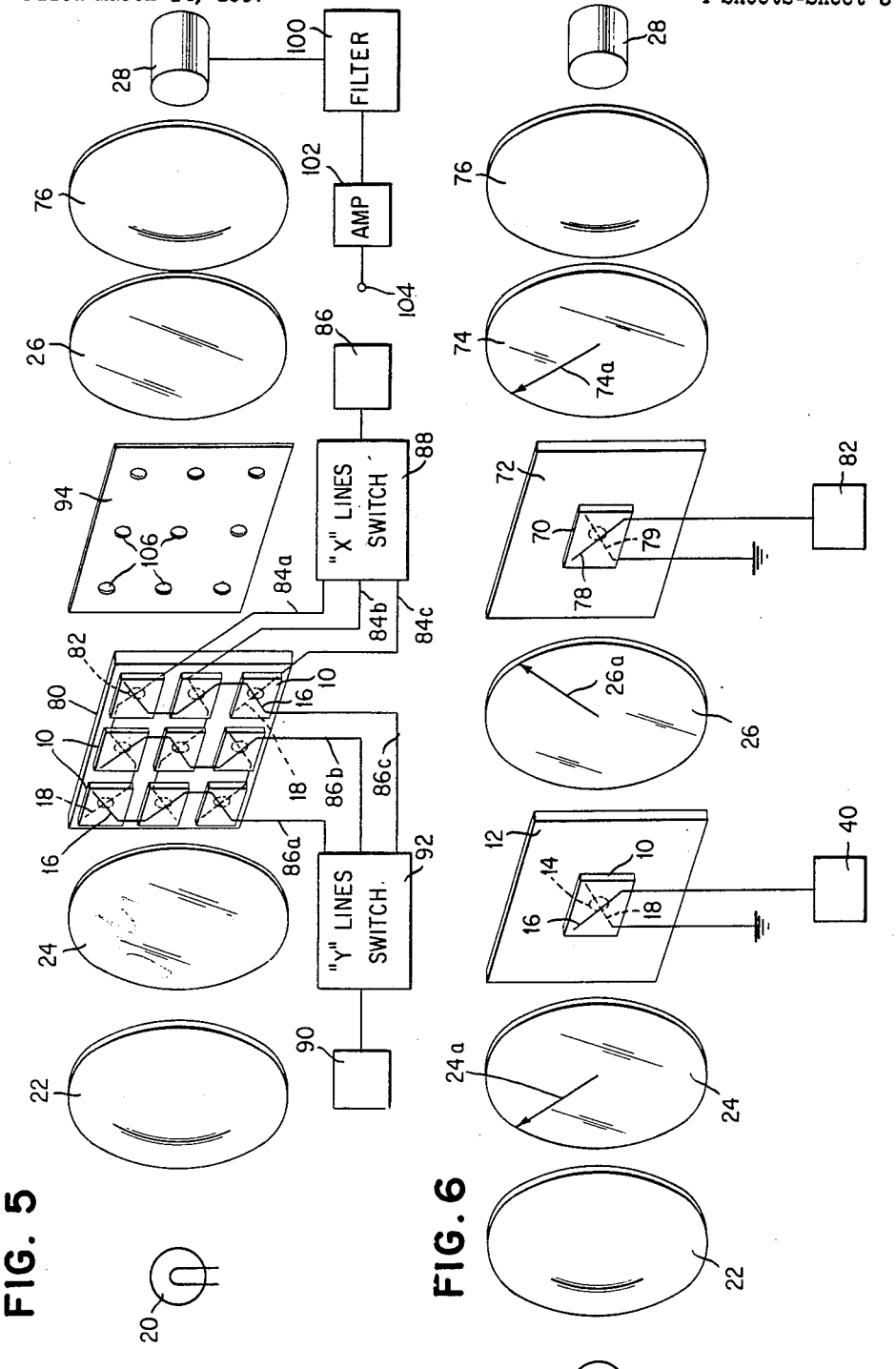

April 3, 1962 A. C. KOELSCH, JR., ETAL 3,027,806
ELECTRO-OPTICAL DEVICES
Filed March 14, 1957 4 Sheets-Sheet 4

United States Patent Office 3,027,806
Patented Apr. 3, 1962

3,027,806
ELECTRO-OPTICAL DEVICES
Albert C. Koelsch, Jr., and Donald R. Young, Poughkeepsie, N.Y., assignors to International Business Machines Corporation, New York, N.Y., a corporation of New York
Filed Mar. 14, 1957, Ser. No. 645,995
24 Claims. (Cl. 88—61)

The present invention is directed to electro-optical systems which utilize as light switching elements bodies of materials which are electro-optically active in accordance with the Kerr electro-optical effect, and more particularly to logical, coordinate selection, and continuous scanning systems employing light switching elements of this type as well as to improved light switching elements usable in such systems.

Light switches utilizing different materials which exhibit the Kerr electro-optical effect and which, therefore, may be termed electro-optically active are, of course, well known as is evidenced by Patents No. 2,597,589 and No. 2,705,903 issued to B. T. Matthias and F. R. Marshall. It has been discovered, though not by the applicants in whose name this application is filed, that barium titanate, when heated above its Curie temperature, exhibits the Kerr electro-optical effect. Specifically barium titanate, when in this condition, is birefringent only when subjected to an electric field. It has been further discovered that barium titanate crystals maintained above their Curie temperature may be employed as light shutters which are operable at extremely high speeds with applied voltage signals of much smaller amplitude than required by switches which employ other electro-optically active materials. Applicants have discovered that, by properly arranging the electrodes on a barium titanate crystal, maintaining the crystal above its Curie temperature, and applying signals of predetermined magnitude, the crystal may be operated as a logical control element in an electro-optical switching system. Further applicants have also discovered that, because of their peculiar non-linear characteristics, electroded crystals of barium titanate may be arranged in a coordinate array of light switches which may be randomly addressed to scan predetermined storage locations of a record card or tape.

A prime object of this invention is, therefore, to provide improved electro-optical switching systems.

A further object is to provide a matrix of light switches for controlling the application of light to predetermined locations on a record document.

Another object is to provide systems of this type capable of providing light and electrical signal outputs in accordance with logical combinations of a plurality of input signals.

Still another object is to provide a matrix of light switches of this type, which may be randomly addressed employing a coordinate selection system.

Another object is to provide an electro-optical system for scanning a plurality of storage positions in a document wherein the storage positions may be interrogated at random or in any desired sequence employing a coordinate system of address selection.

The structure herein described by way of illustrating the manner in which applicants have achieved these objects is, for its operation, dependent largely upon relationships between the light output and applied voltage in systems of this type. Barium titanate is not ordinarily birefringent when maintained above its Curie temperature. However, when subjected to an electric field the material becomes birefringent. The light output of a system wherein a crystal of barium titanate, maintained above its Curie temperature, is placed between a pair of cross polarizers, varies with the sine squared of the ratio of the applied voltage to a constant for the particular crystal used. The curve depicting this relationship contains a plurality of nulls, points of no light output, and peaks, points of maximum light output, and, by applying voltage signals of predetermined magnitude to a pair of electrodes on such a crystal, switching can be accomplished in accordance with different logical combinations of the input signals.

Further, when small voltage signals are applied, it has been found that the light output of such a system is related to the electrical input by essentially a square law. Crystals of barium titanate, when addressed with signals in this range, function as frequency mixers and may be arranged in a coordinate array, in which selection is achieved employing coordinate row and column drive lines to which voltage signals of different frequency are applied. The frequency components contained in the light output of each crystal in such an array are related to the frequencies of the voltage signals applied thereto and the light output of a crystal at the intersection of a selected row and a selected column drive line contains the applied frequencies, sum and difference frequencies and multiples thereof. Such an array may be utilized to selectively interrogate a record document placed between light switches and the second of the pair of cross polarizers of the type usually employed in systems of this type. The light output is transformed by a photomultiplier into an electric signal which contains these frequencies. This signal is applied to a filter which passes signals at only one or the other of the sum and difference frequencies so that the output signal produced reflects only the effect of the record document on the light which passed through the light switch at the intersection of the addressed drive lines. The same result may be achieved by mounting the record document between the second polarizer and the photomultiplier.

In accordance with another embodiment of the invention a high speed continuous optical scanner may be constructed employing a pair of cross polarizers and a barium titanate crystal to which electrodes have been applied in such a manner that the electrodes form a delay line down which an input pulse may be propagated. As the input pulse is propagated, each of the successive portions of the barium titanate between the electrodes is subjected to an electric field which causes rotation of the light then passing through that portion. The output rotated light vector, therefore, scans in a pattern corresponding to the configuration of the track defined by the electrodes on the face of the barium titanate crystal.

Thus another object of this invention is to produce a high speed optical scanner.

A further object is to provide improved control elements for use in electro-optical logical, coordinate selection, and continuous scanning systems.

Another object of this invention is to produce an electrically controlled frequency mixer for electromagnetic radiations.

A further object is to provide crystals having electrodes affixed in a novel manner to form a coordinate array of electro-optical light switches.

Another object is to provide light switching devices selectively operable at extremely high speeds to direct light energy to predetermined positions on a record document.

Other objects of the invention will be pointed out in the following description and claims and illustrated in the accompanying drawings, which disclose, by way of example, the principles of the invention and the best mode, which has been contemplated, of applying the principle.

In the drawings:

FIGS. 4A and 4B are schematic wiring diagrams illustrating how a crystal, such as is shown in FIG. 4, may be employed as a logical switching element in an electro-optical system.

FIG. 5 shows an electro-optical scanning system employing a plurality of light switches arranged in a coordinate array.

FIGS. 5A and 5B show single crystal embodiments of coordinate arrays of electro-optical switching devices.

FIG. 6 is an embodiment of a logical electro-optical gating system.

Figure 1:
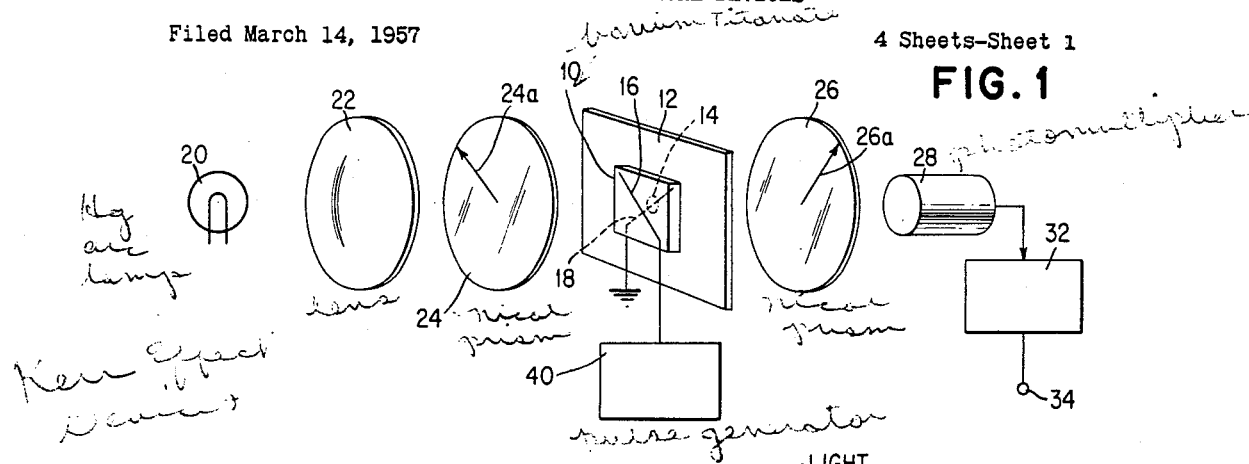
FIG. 1 shows a first embodiment of an electro-optical switch.

Referring now to FIG. 1 there is shown an electro-optical shutter, or light switch, which in operation utilizes the Kerr effect in a body of a material which, for the illustrative purposes of this disclosure is shown and described as a crystal 10 of barium titanate maintained at a temperature above its Curie temperature. The Curie temperature for most barium titanate crystals is in the vicinity of 120° C. The crystal is mounted on an opaque plate or block 12 having an aperture 14 aligned with a small portion of the crystalline material located around a point which defines the projected intersection of two electrodes 16 and 18 affixed to opposite faces of the crystal. The crystal 10 of barium titanate in the embodiment of FIG. 1 and the crystals shown in subsequent embodiments are maintained at temperatures above their Curie temperatures by placing them in an oven, which, to avoid overcomplicating the drawings with conventional structure, is not here shown.

The light for the shutter of FIG. 1 is supplied by a mercury arc lamp 20 and is focused by a lens 22. The crystal 10 is mounted between a pair of cross polarizers 24 and 26 which are effective, when no voltage is applied to the crystal, to prevent any light from reaching an output photomultiplier 28. The directions of acceptance of polarizers 24 and 26 are as indicated by arrows 24a and 26a. It should be here noted that the light waves propagated through the electro-optical systems of the present invention are, of course, electromagnetic waves and therefore include both electric and magnetic vectors. The discussion to follow of the principles of operation of the inventive structures will be concerned with the electric vectors of these electromagnetic light waves.

The polarizer 24 is effective to absorb all of the incident ligh except a component in one predetermined direction and thus the light incident on crystal 10 is plane polarized. When no voltage is applied to crystal 10, this plane polarized light is passed through the crystal undisturbed and is incident on polarizer 26. The direction of acceptance of this polarizer is substantially at right angles to the direction of acceptance of polarizer 24 and thus all of the incident light is absorbed and no light reaches photomultiplier 28.

Figure 4:
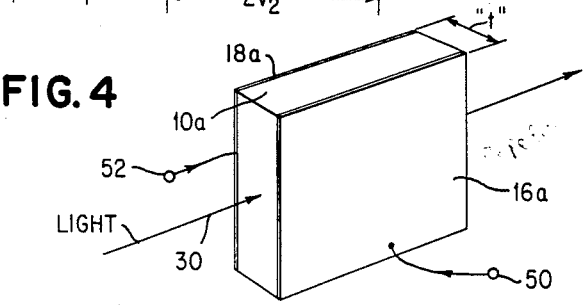
FIG. 4 is a further embodiment illustrating the manner in which the electrodes may be applied to a birefringent crystal and the crystal mounted in a system such as is shown in FIG. 1.

The birefringent properties of a crystal of barium titanate may be best understood by a consideration of crystal 10a shown in FIG. 4. The crystal is mounted similarly to crystal 10 in FIG. 1 between a pair of cross polarizers so that the light passed through the first polarizer 24 is being propagated along the line defined by an arrow designated 30. If we consider that the direction of acceptance of polarizer 24 is as indicated by the arrow 24a shown in FIG. 1, the plane polarized light incident on the crystal 10a of FIG. 4 may be considered to have two components in a plane normal to the direction of propagation, one parallel to the dimension "t" of crystal 10a and one normal to this dimension. When the crystal is in an unbiased condition, the light incident on the crystal passes therethrough undisturbed. However, when a voltage is applied between a pair of electrodes 16a and 18a, the barium titanate becomes birefringent and, therefore, the component of the incident light vector parallel to the dimension "t" and, thus, parallel to the applied electric field propagates through the crystalline material at a greater rate than the component at right angles to the applied electric field. The light component parallel to the applied field is usually termed the extraordinary ray and that normal to the applied field the ordinary ray and where, as here, the extraordinary ray propagates though the material at a rate greater than the ordinary ray, the phenomenon is known as positive birefringence. Conversely, when an applied field is effective to slow down the propagation rate of the extraordinary ray, the phenomenon is known as negative birefringence. As a result of the aforesaid difference in the rate of propagation in the crystal of the ordinary and extraordinary rays, the crystal is effective to rotate the plane of polarization of the light passing therethrough and the light leaves the crystal 10a "elliptically polarized" and containing a component parallel to the direction of acceptance of polarizer 26. This component is incident on photomultiplier 28 causing an output signal to be developed thereby which after amplification by amplifier circuitry represented by a box 32, is manifested at a terminal 34. It is, of course, obvious from the above description that, in order to rotate the plane of the light passing through crystal 10a, it is necessary that the light contain components in directions both normal to and parallel to the dimension "t" of crystal 10a. Thus the direction of acceptance of polarizer 24 may not be parallel to either of these two directions if the light is to be rotated by applying an electric field to the crystal 10a.

Figure 2:
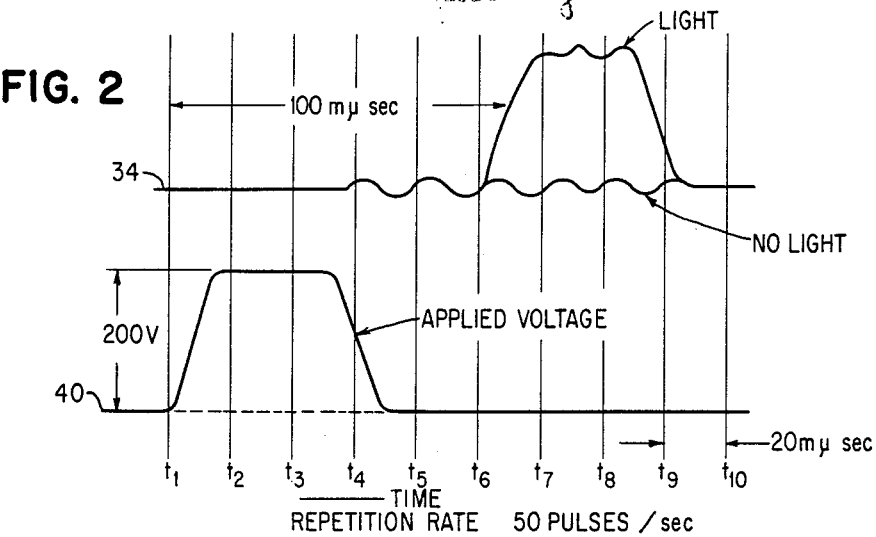
FIG. 2 is a timing diagram depicting the speed of response for a light switch such as is shown in FIG. 1.

The operation is similar for the embodiment of FIG. 1, the main difference being in the nature of the electric field applied to the crystal 10 when a voltage is developed between the electrodes 16 and 18 affixed on opposite faces of the crystal. It has been found that the application of a voltage between electrodes mounted in this manner causes to be established what is here termed a "fringe field" which field is effective to rotate the plane of polarization of light passing through the crystal. Thus, crystals having electrodes affixed in the manner shown in FIG. 1 may be used in electro-optical light shutter applications and the timing diagram of FIG. 2, which is based on oscilloscope readings taken using a system such as is shown in FIG. 1, illustrates the switching speeds obtainable. The input is applied by a pulse generator 40 which is connected to electrode 16, the electrode 18 being connected to ground. The input is applied at time $t_1$, and is maintained for approximately three and one half of the time intervals shown, each time interval being, as indicated, equal to 20 millimicroseconds. The duration of the input pulse is thus approximately 70 millimicroseconds and the leading edge of the output pulse is developed some 100 millimicroseconds after the leading edge of the input pulse is applied. The entire cycle illustrated encompasses only 180 millimicroseconds and the actual light switch operation is believed to be faster than illustrated, the speed achieved being restricted somewhat by the response time of the output circuitry.

Figure 3:
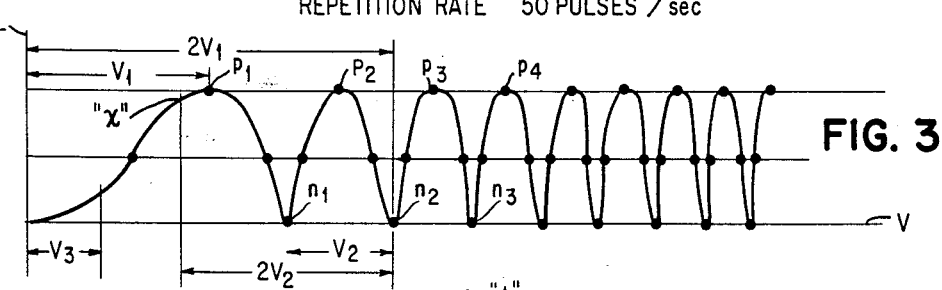
FIG. 3 is a diagram depicting the relationship between light output and applied voltage in an electro-optical light switch employing a crystal structure such as is shown in FIG. 4.

When a crystal of barium titanate, such as is shown at 10a in FIG. 4 with electrodes 16a and 18a, is mounted in a system such as is shown in FIG. 1 so that the plane polarized light incident thereto is being propagated in the direction of arrow 30, the relationship between the magnitude of voltage (V) applied between electrodes 16a and 18a and the light output (L) applied to photomultiplier 28 is, as indicated in FIG. 3. Assuming the response of the photomultiplier 28 and amplifier 32 to be linear, the output signal developed at terminal 34 is, of course, directly proportional to the light output (L). The curve of FIG. 3 contains a series of null points $n_1$, $n_2$ etc., the first null point $n_1$ representing 180 degrees of rotation of the plane of the light applied to crystal 10a and the successive null points thereafter representing rotations which are in effect multiples of 180 degrees. The curve also contains a series of peaks $p_1$, $p_2$ etc., the first peak $p_1$ occurring for an applied voltage effective to cause a rotation of 90 degrees and the successive peaks thereafter occurring for rotations which are in effect odd multiples of 90 degrees.

By applying voltage pulses of proper magnitude, a crystal, electroded, as shown in FIG. 4, may be employed to control a light shutter, such as is shown in FIG. 1, in accordance with logical combinations of input pulses applied to a pair of terminals 50 and 52 which are connected to electrodes 16a and 18a, respectively. For example the light shutter may be controlled to produce light outputs in accordance with the Exclusive OR logical function by applying pulses, which in magnitude are equal to that indicated at $V_1$ in FIG. 3, to each of the input electrodes. It should be here noted that the light output (L) of a switch employing a crystal, electroded in the manner shown in FIG. 4, is proportional to sine$^2$ ($V/V_0$) where V is equal to the magnitude of the applied voltage and $V_0$ is a constant for the particular crystal. The curve of FIG. 3 illustrates this sine squared relationship. For example, if we consider the first null $n_1$ to occur for one value of an applied voltage, then the first peak $p_1$ occurs at .707 of this value and the second null $n_2$ occurs at 1.414 times this value of applied voltage. Thus the voltage value corresponding to the second null $n_2$ is twice the voltage value at the first peak $p_1$.

Reverting to the consideration of the Exclusive OR operated light switch it can be seen from an examination of FIG. 3 that when a voltage signal of $V_1$ volts is applied to either one of the terminals, 50, 52 exclusively, the other terminal being then at ground potential, the output of the light switch is at a maximum. This is true regardless of the polarity of the applied pulse since the curve of FIG. 3 represents the light output-voltage relationship for different magnitudes of applied voltage regardless of the polarity. Now if two such pulses in magnitude equal to $V_1$, or in fact any two pulses of like polarity and of equal magnitude, are coincidently applied, one to terminal 50 and the other at terminal 52, there is no voltage drop across the crystal 10a and no light is incident on the photomultiplier. Similarly if two such pulses of $V_1$ volts and of opposite polarity are coincidently applied to terminals 50, 52, then the total voltage applied to crystal 10a is equal to $2V_1$ and the light output, once a steady state is reached, is essentially zero. Thus, by employing voltage pulses of this magnitude light can be controlled in accordance with the Exclusive OR logical function and the system is not polarity sensitive; that is, if a pulse of either polarity is applied to one of the input terminals exclusively, a light output is produced and no output is produced if pulses are coincidently applied to both terminals regardless of whether or not the input pulses are of the same or of opposite polarity. A circuit schematically illustrating the manner in which such pulses may be applied is shown in FIG. 4A wherein voltage pulses of either polarity may be individually or coincidently applied to the input terminals 50, 52 by properly operating the proper one or both of a pair of switches 54, 56. It should also be obvious that Inclusive OR operation may be accomplished by applying pulses of opposite polarity and proper magnitude to the electrodes 16a and 18a.

A crystal such as is shown in FIG. 4 may be also used to control a light switch, such as is shown in FIG. 1, in accordance with the "AND" logical function. When this type of operation is desired the crystal is biased with a voltage equal to $2V_1$ volts and the pulses applied to the input terminals are each in magnitude equal to $V_2$ volts and of a polarity to reduce the total voltage across the crystal. An applied voltage of $2V_1$ volts is as stated above sufficient to rotate the incident light 360° and with a bias voltage of this magnitude applied no light output is produced, the system being then in the condition indicated at null point $n_2$ in FIG. 3. When a voltage signal of proper polarity and in magnitude equal to $V_2$ volts is applied to one of the input terminals exclusively, the operating point is changed from the null at $n_2$ to that at $n_1$. Thus, in the steady state reached when such a signal is applied, no light output is produced. However, when two such signals are applied coincidently, one to each of the input terminals 50, 52, the operating point is, as indicated in FIG. 3 shifted to a point designated "$x$" at which point the light output approaches a maximum. A circuit which schematically illustrates the manner in which bias and input signals may be applied to operate the light switch in this manner is shown in FIG. 4B. The bias of $2V_1$ volts is supplied by a voltage source 60, and the input signals are applied by selectively operating one or both of a pair of switches 62, 64. When either of these switches is operated, the corresponding one of a pair of voltage sources 66 and 68 applies a signal in magnitude equal to $V_2$ volts and of a polarity to reduce the total voltage across the crystal 10a. From the relationship of applied voltages given above, it should be apparent that each of the applied input signals of $V_2$ volts is in magnitude equal to $1/1.414$ of the bias voltage $2V_1$ volts.

FIG. 6 shows another method of constructing a light switch operable in accordance with the "AND" logical function. The system is similar to that of FIG. 1 with the exception that the second polarizer 26 is separated from the photomultiplier by a second crystal of barium titanate 70 mounted on a plate 72, and another polarizer 74. A second lens 76 is also added to collect the light output. The directions of acceptance of the three polarizers 24, 26 and 74 are as indicated by arrows 24a, 26a and 74a. When no voltage is developed between electrodes 16 and 18 all of the light supplied by source 20 is absorbed by polarizers 24 and 26. However, when signal source 40 is actuated, a voltage pulse is applied to electrode 16 causing the plane polarized light incident upon crystal 10 to be rotated and changed into elliptically polarized light containing a component capable of passing through polarizer 26. The light passed through this polarizer is, of course, plane polarized and is applied to crystal 70. When no voltage is developed between a pair of electrodes 78 and 79 on crystal 70, this plane polarized light passes therethrough undisturbed and is absorbed by polarizer 74. However, when a voltage signal is applied by a signal source 82 to electrode 78, coincidently with the application of a signal by signal source 40, the plane polarized light incident upon crystal 70 is rotated and leaves the crystal as "elliptically polarized" light having a component capable of passing through polarizer 74 and being focussed on photomultiplier 28 by lens 76. Thus no light can reach photomultiplier 28 unless both of the signal sources 40 and 82 are coincidently actuated. It should be here noted that when operating with crystals having electrodes attached as are the electrodes 16 and 18, and 78 and 79, the voltage signals applied may be appreciably less than that required to rotate the plane polarized light by 90°. If we could consider that the relationship between applied voltage and light output is as depicted in FIG. 3, which, of course, is not the case since the resulting electric field producing birefringent effects is here not uniform, the applied voltage pulses would be in the range indicated by the arrow $V_3$.

When operating in this lower voltage range, the voltage-light output relationship remains nonlinear but the light output can be considered to be related to ratio $V/V_0$ by a square law rather than by a sine square law. Because of these nonlinear characteristics of the crystalline material it has been found that, when two voltage signals of different frequency are applied to electrodes, such as 16 and 18, the light output includes components at both of these frequencies as well as components at both the sum and difference of the applied frequencies and multiples thereof. This phenomenon may be utilized to construct a matrix of light switches which may be selectively addressed using a coordinate selection system and the output of each of the light switches in the matrix may be employed to scan a particular location on a record document such as a punched card or tape.

FIG. 5 illustrates a system of this type. As there shown, a plurality of crystals 10 are mounted on a plate 80 with each crystal having on opposite faces a pair of crossed electrodes 16 and 18. The plate is provided with a plurality of apertures 82 each of which is aligned with the projected intersection of a pair of electrodes on a corresponding one of the crystals 10. The crystals are addressed by means of three horizontal or "X" selection lines 84a, 84b, and 84c and three vertical or "Y" selection lines 86a, 86b and 86c. Each of the X lines is coupled to the lower electrodes 18 on each of the crystals in a corresponding horizontal row of the matrix and each of the Y lines is coupled to the upper electrodes on each of the crystals in a corresponding vertical column of the matrix. Signals are supplied to the X lines from a signal source 86 under the control of a plurality of X lines switches represented by box 88. Signals are similarly supplied to the Y lines by a signal source 90 under the control of a plurality of Y line switches shown in box form and designated 92. The signals supplied by the source 86 are of a frequency $f_1$ and those supplied by signal source 90 are of a different frequency $f_2$.

The document to be scanned is designated 94 and may be located, as shown, between the matrix of crystals 10 and the polarizer 26 or between the second polarizer and the output photomultiplier. The remaining components in the system, which are similar to those described in previous embodiments are identified with the same reference numerals as there used. The output of the system is applied to a filter 100, which may be selected to pass signals at a frequency equal to either the sum or difference of the applied frequencies $f_1$ and $f_2$. Here filter 100 is chosen to pass signals at the sum frequency. This output is fed to an amplifier 102 and after amplification is manifested at a terminal 104.

The record document to be sensed is shown to include nine perforations 106 which are aligned with the apertures 82 in plate 80. Since the purpose of the system is to sense the presence or absence of perforations or recordings in particular recording locations of the document, it is not usual that the document will be perforated in each of these locations but the recordings are shown in this manner in this illustrative embodiment to indicate the recording positions.

The recording location in the upper left-hand corner of record document 94 may be sensed when the X and Y line switches 88, 92 are so controlled that the signal at frequency $f_1$ supplied by source 86 is applied to line 84a and the signal at frequency $f_2$ supplied by source 90 is applied to line 86a. As a result, signals of frequencies $f_1$ and $f_2$, respectively, are applied to the opposing electrodes 18 and 16 on the upper left-hand crystal 10 of the matrix of crystals mounted on plate 80. The light rays passing through the aperture 82 aligned with the projected intersections of these two electrodes thus contains components of frequencies $f_1, f_2, f_1+f_2$ and $f_1-f_2$. These rays are directed at the upper left storage location on record 94 and, where, as here, there is a perforation in that location, pass through that perforation and are applied to polarizer 26. Because of the rotation effected by the crystal 10, all of this light is not absorbed by the polarizer 26 and thus light energy containing the above frequencies passes through lens 76 to the input of photomultiplier 28. The output of this photomultiplier is in the form of an electrical signal containing components at these same frequencies, and, since filter 100 passes only the frequency $f_1+f_2$, it is only the signal at that frequency which is amplified and appears at terminal 104. If there is no perforation in the sensed location, the light rays are, of course, absorbed by the document 94.

The remaining crystals 10 in the upper row mounted on plate 80 are subjected only to the signal at frequency $f_1$ and those in the left hand column only to the signal at frequency $f_2$. As a result the light rays passing through the apertures 82 aligned with these crystals contain only these individual frequencies. If allowed by perforations in corresponding locations in document 94, rays at these individual frequencies are applied to photomultiplier 28, but, since filter 100 passes signals only at the sum frequency $f_1+f_2$, they are ineffective to produce outputs at terminal 104. It is thus apparent that the presence or absence of an output at 104 indicates whether or not there is a perforation at the location in document 94 which corresponds to the addressed crystal, that is, the crystal at the intersection of the X and Y lines to which the signals at frequencies $f_1$ and $f_2$, respectively, are applied.

The system shown thus has the advantage of what is termed "random access," that is, any one of the recording locations which may also be termed storage positions, may be interrogated at will, merely by controlling the X and Y line switches so that the signals from source 86 and 90 are applied to the proper row and column drive lines. The record document may, of course, be scanned in any particular desired sequence by properly controlling the application of signals to these drive lines.

A similar system may be constructed using a barium titanate selection matrix such as is shown in FIG. 5A. Here only a single large crystal 110 mounted on a plate 112 is utilized, with X drive lines 84a, 84b and 84c being connected to electrodes extending horizontally across one face of the crystal and the Y drive lines 86a, 86b and 86c being connected to electrodes extending vertically across the other faces of the crystal. Apertures 114 are as before aligned with projected intersections of the electrodes. The electrodes are, as before, effective, when signals are applied thereto, to produce a "fringing type" field which rotates the plane of the light passing through the crystal and the frequency components included in the light rays passing through the corresponding apertures are determined by the frequencies of the signals applied to the X and Y drive lines.

Still another embodiment for achieving this same type of selection is shown in FIG. 5B. Here, on the front face of crystal 120, there are mounted a plurality of vertical electrodes 122 and horizontal electrodes 124. The electrodes, as is indicated by the broken away section in the upper left-hand corner of the figure, are insulated from each other at the points of intersection. The vertical electrodes are provided, near each of the intersections, with horizontal extensions 122a. When signals are applied to the X and Y drive lines, which are connected as shown, electric fields effective to rotate the plane of the incident light, are produced in the portions of the barium titanate between the horizontal electrodes 124 and the extensions 122a of vertical electrodes 122. These portions are schematically indicated by the cross hatched sections shown in the upper part of the drawing. The apertures in the backing plate on which the crystal 120 is mounted are, of course, aligned with these portions of the crystal. Selection is achieved with a matrix of this type by applying signals of different frequencies to the X and Y drive lines and filtering all but either the sum or difference frequency from the output of the photomultiplier 28.

Since, as it has been heretofore explained, light switches constructed as shown in FIG. 4 may be operated in accordance with the AND logical function, it is, of course, obvious that a matrix of light switches, randomly addressible with coordinately arranged drive lines, might also be constructed utilizing switches of this type. The basic circuit for this type of operation is illustrated in FIG. 4B. The bias source 60 is connected to one of the capacitor electrodes to bias the capacitor at the operating point "x" of FIG. 3. "X" and "Y" selection pulses are applied by sources 66 and 68 respectively. The system is similar in operation to that shown in FIG. 5. In such a system the record document, as in the embodiment of FIG. 5, might be mounted either between the matrix of light switches and the second polarizer or between the second polarizer and the photomultiplier. Of course in a coordinate scanning system employing switches of the type shown in FIG. 4, it would not be necessary to employ a filter in the output circuitry.

Figure 7:
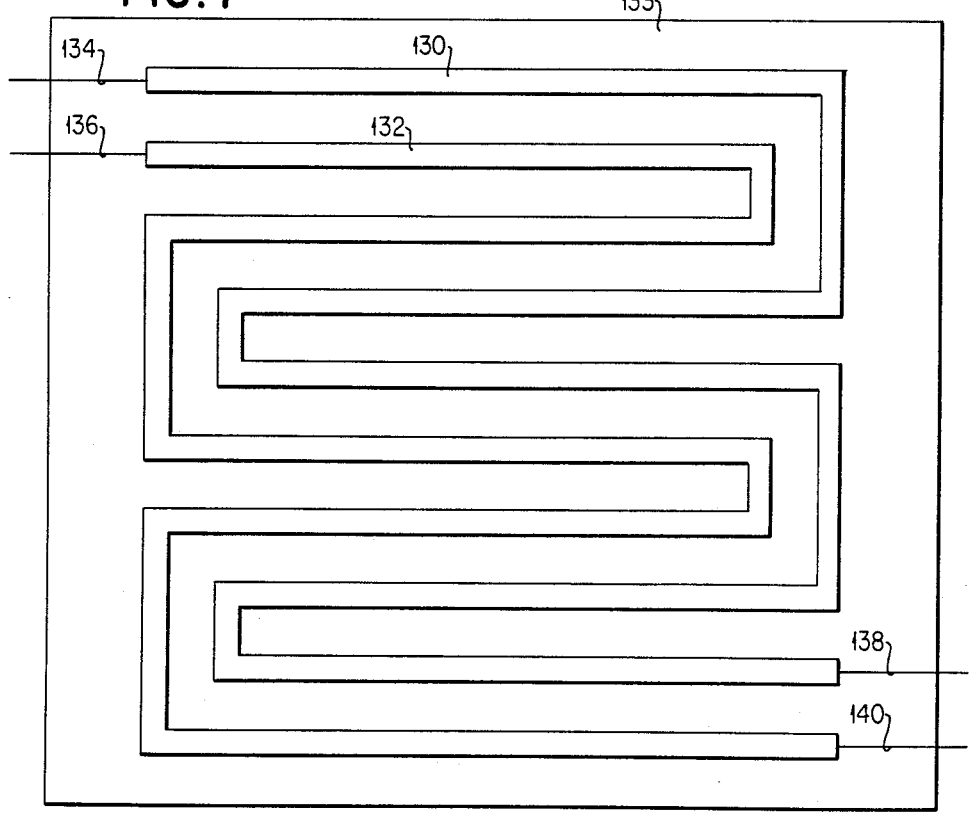
FIGS. 7 and 8 illustrate the manner in which electrodes may be applied to a barium titanate crystal to form a control element usable in a high speed optical scanner.

A further embodiment of the invention is shown in FIG. 7 which illustrates the manner in which a control element for an extremely high speed continuous optical scanning device may be constructed. In this embodiment a pair of electrodes 130 and 132 are formed on one surface of a crystal 133 so as to form a continuous track from a pair of input leads 134 and 136, between which an input pulse is applied, to a pair of terminating leads 138 and 140. The electrodes 130 and 132 on the surface of the crystal 133 actually form a delay line, the dielectric medium of which is formed both of air and the portion of barium titanate between these electrodes. When an input pulse is applied between leads 134 and 136, it is propagated between the electrodes 130 and 132 at a speed which is principally determined by the dielectric constant for the barium titanate, which, when the material is held above its Curie point, is in the vicinity of 10,000. The propagation rate may be expressed as being equal to $c/\sqrt{k}$ where "$c$" is the velocity of light and "$k$" the dielectric constant for the barium titanate. For a value of "$k$" equal to 10,000 the propagation rate is equal to 1/100 of the speed of light.

When a crystal electroded in this way is mounted in an electro-optical system, such as is shown for example in FIG. 1, the application of a voltage signal between leads 134 and 136 causes portions of the barium titanate between electrodes 130 and 132 to be successively subjected to an electric field as the pulse propagates down the delay line formed by the electrodes. As each portion of the barium titanate is subjected to an electric field, the plane polarized light incident thereon is rotated and leaves that portion of the crystal as "elliptically polarized light" which contains components capable of passing the second polarizer 26. If we consider that the backing plate on which the crystal is mounted has an opening corresponding to the track formed between electrodes 130 and 132, and further consider only the elliptically polarized light output of crystal 133, it becomes apparent that this output of elliptically polarized light is in the form of a beam moving in a pattern corresponding to the configuration of the track formed between electrodes 130 and 132. Such a scanning beam may, of course, be utilized to scan a record document, such as that shown at 94 in FIG. 5, it being, of course, necessary as is usual in scanning systems of this type to strobe the output to determine the information stored in particular locations on the record.

Figure 8:
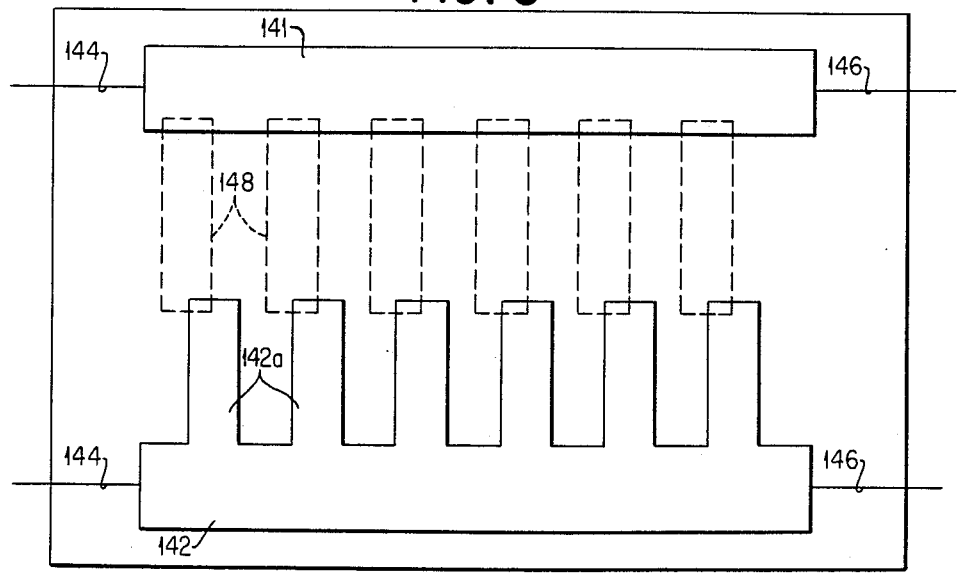

Because of the extraordinary speed of the scanning beam realized with a configuration such as is shown in FIG. 7, it might be advisable to slow down the propagation rate of the beam and thereby simplify the output strobing circuitry. This may be accomplished by modifying the construction in the manner shown in FIG. 8. In this figure two electrodes 141 and 142 are shown by way of illustration to form only a single horizontal track between input leads 144. The extensions 142a from electrode 142 effectively add inductance to the delay line and the electrodes 148 on the other side of the crystal add capacitance so that the propagation rate of an applied signal and therefore of the elliptically polarized light beam output is slower than in the embodiment of FIG. 7. With the construction shown the light output will be interrupted by the extensions 142a and electrodes 148 and the storage locations on the document to be sensed must be aligned with the spaces between these members. It is, of course, apparent that electrodes may be affixed to a barium titanate crystal to form a track of any desired configuration and therefore a beam of elliptically polarized light following any desired pattern may be produced.

While there have been shown and described and pointed out the fundamental novel features of the invention as applied to preferred embodiments, it will be understood that various omissions and substitutions and changes in the form and details of the devices illustrated and in their operation may be made by those skilled in the art without departing from the spirit of the invention. It is the intention therefore, to be limited only as indicated by the scope of the following claims.

What is claimed is:

1. In an optical shutter of the type wherein a pair of polarizers are mounted on either side of a body of electro-optically active material, first and second electrodes on said body of electro-optically active material and means for causing said body to change the polarization of light passing therethrough comprising first means for applying alternating electric signals at a first frequency to said first electrode and second means for applying alternating electric signals at a second frequency to said second electrode said first and second means being selectively operable to apply said signals exclusively or coincidently to said first and second electrodes and to change said polarization at frequencies equal to the sum of and the difference between said first and second frequencies when said signals are applied concidently.

2. The invention as claimed in claim 1 wherein said body of material comprises barium titanate maintained at a temperature above its Curie temperature.

3. A frequency mixer comprising a body of material effective when subjected to an electric field to change the polarization of electromagnetic waves passing therethrough, means for causing plane polarized electromagnetic waves to be incident on said body, and means for controlling the frequency of amplitude variation of the electromagnetic waves leaving said body comprising means for coincidently applying electric signals of the different frequencies to said body.

4. An electro-optical system comprising a coordinate array of light modulating elements arranged in columns and rows, each of said elements comprising first and second electrodes on a body of electro-optically active material having first and second faces, a source of plane polarized light located on one side of said array of light modulating elements so that said plane polarized light is incident on said first face of each of said elements, a plurality of row drive lines each coupled to at least one of the electrodes on each of said elements in a corresponding row of said array for applying thereto first signals at a first frequency, a plurality of column drive lines each coupled to at least one of the electrodes on each of said light modulating elements in a corresponding column of said array for applying thereto second signals at a second frequency, and means for detecting light passing through said modulating elements at a resultant frequency produced by the interaction of said first and second signals and for producing corresponding electric signals at said resultant frequency.

5. In an electro-optical system, a plurality of light modulating elements, each of said elements comprising a pair of electrodes on a body of electro-optically active material having first and second faces, a source of plane polarized light located on one side of said plurality of light modulating elements so that said plane polarized light is incident on said first face of each of said elements, a record document located on the other side of said plurality of light modulating elements, electric signal means coupled to said electrodes for selectively applying signals thereto to selectively cause said light modulating elements to change the polarization of the light passing therethrough and thereby selectively control the light energy directed at predetermined locations on said record document.

6. The invention as claimed in claim 5 wherein said body of electro-optically active material comprises barium titanate maintained at a temperature above its Curie temperature.

7. An electro-optical system comprising a block, a plurality of light switching elements mounted on one side of said block, said block being provided with a plurality of apertures each corresponding to one of said light switching elements, each of said light switching elements comprising at least a portion of electro-optically active material aligned with a corresponding aperture in said block and a pair of electrodes effective when a potential difference is established therebetween to subject said portion of said material to an electric field, a source of plane polarized light located on one side of said block on which said elements are mounted, said portions of said electro-optically active material being effective when subjected to an electric field to change the polarization of light passing therethrough, a record document located on the other side of said block so that light from said source can reach the document only by passing through one of said portions of material and an aligned aperture in said block, and means coupled to said electrodes for selectively establishing potential differences between said pairs of electrodes.

8. In an electro-optical scanning system, a matrix of light switching elements mounted on a block in the form of a coordinate array of columns and rows, each of said elements comprising a body of electro-optically active material and first and second electrodes mounted thereon, said block being provided with a plurality of apertures each corresponding to one of said elements, a source of plane polarized light on one side of said block on which said light switching elements are mounted, a record document mounted on the other side of said block with recording positions thereon aligned with apertures on said block, a plurality of column drive lines each associated with the first electrodes on the elements in a corresponding column of said array, a plurality of row drive lines each associated with the second electrodes on the elements in a corresponding row of said array, first means for applying signals at a first frequency selectively to said column drive lines, second means for applying signals at a second frequency selectively to said row drive lines, a polarizer mounted on the side of said block away from said light source, third means effective to produce an electric signal in response to the application of light mounted on the side of said polarizer away from said block, an output terminal, and means including frequency filtering means excluding signals of said first frequency and of said second frequency and passing a resultant frequency of either the sum or difference of said first and second frequencies coupling said third means to said output terminal.

9. In an electro-optical system, a body of electro-optically active material mounted on a block, first and second electrodes on said body so arranged that a projection of said first electrode intersects said second electrode, an aperture in said block aligned with a portion of said body in the vicinity of said projected intersection of said electrodes the total area of said aperture being substantially greater than the area of said aperture aligned with said electrodes, a source of plane polarized light on one side of said block, a record document on the other side of said block having a predetermined location aligned with said aperture, electric signal means coupled to at least one of said electrodes for causing an electric field to be established in said portion of said body aligned with said aperture and render said body effective to alter the polarization of light passing therethrough and thereby control the propagation of light in the direction of said predetermined location on said record document.

10. In an electro-optical system of the type wherein a polarizer is mounted between a body of electro-optically active material and a source of light so that light from said source propagates through said polarizer to and through said body, means for changing the polarization of light passing through said body comprising, first and second electrodes each mounted on a first face of said body substantially normal to the direction in which said light propagates through said body, and means coupled to at least one of said electrodes for causing one electrode to be at a different electric potential than the other electrode.

11. An electro-optical system for determining the presence or absence of a perforation in a predetermined location on a record comprising a source of plane polarized light, a body of electro-optically active material having first and second electrodes thereon, said body being mounted so that light from said source must pass therethrough to reach said predetermined location on said record, a polarizer mounted on the side of said body away from said light source, first means responsive to produce an electric signal in response to the application of light mounted on the side of said polarizer away from said body, an output terminal, circuit means coupling said first means to said output terminal, and first and second individual input signal means coupled to said first and second electrodes for applying thereto signals such that an output is developed at said output terminal only when signals are applied to said first and second electrodes coincidently and there is a perforation in said predetermined location on said record.

12. In an electro-optical system for producing a light output in accordance with the AND logical function, a body of electro-optically active material mounted between first and second polarizers, first and second electrodes on said body, means for causing light to propagate through said first polarizer and said body to said second polarizer, the potential drop between said electrodes normally being such that said light incident on said second polarizer does not pass therethrough, first means controllable to apply signals to said first electrode and second means controllable independently of said first signal applying means to apply signals to said second electrode, said signals having a magnitude such that the light incident on said second polarizer contains a component in a direction to pass therethrough only when signals are applied to both of said electrodes coincidently.

13. In an electro-optical system for producing a light output in accordance with the AND logical function, a body of electro-optically active material mounted between first and second polarizers, first and second electrodes on said body, means for causing light to propagate through said first polarizer and said body to said second polarizer, means applying a biasing potential between said electrodes, first and second means for applying signals to said first and second electrodes, respectively, the magnitude of said biasing potential and said signals being such that the light incident on said second polarizer contains a component in a direction to pass therethrough only when signals are coincidently applied to said first and second electrodes.

14. In an electro-optical system for producing a light output in accordance with the Exclusive OR logical function, a body of electro-optically active material mounted between first and second polarizers, first and second electrodes on said body, means for causing light to propagate through said first polarizer and said body to said second polarizer, the potential drop between said electrodes being normally such that said light is absorbed by said second polarizer, first and second means controllable to apply to said first and second electrodes, respectively, signals of a magnitude such that the light incident on said second polarizer contains a component in a direction to pass therethrough only when a signal is applied to one of said electrodes, exclusively.

15. In an electro-optical system for producing a light output in accordance with the Exclusive OR logical function a body of electro-optically active material mounted between first and second polarizers, first and second electrodes on said body, means for causing light to propagate through said first polarizer and said body to said second polarizer, the potential drop between said electrodes being normally such that said light is absorbed by said second polarizer, first and second means for applying signals to said first and second electrodes respectively, the magnitude of said signals being such that the coincident application of signals to said first and second electrodes is effective to rotate the plane of light passing through said body by 180 degrees.

16. In an electro-optical system of the type wherein a body of electro-optically active material is mounted between first and second cross polarizers with said first polarizer being between said body and a light source and said second polarizer being between said body and light responsive means, means for producing a light output scanning in a predetermined pattern comprising, first and second electrodes mounted on one face of said body spaced apart to form therebetween a track conforming to the desired scanning pattern, and means coupled to one end of said electrodes for applying thereat a pulse effective to successively establish electric fields in portions of said material between said electrodes as it propagates from said one end of said electrodes to the other end thereof.

17. The invention as claimed in claim 16 wherein said first electrode is provided with projections extending in said track toward said second electrode and further electrodes are provided on the other face of said crystal opposite said track.

18. In an electro-optical system of the type wherein a body of electro-optically active material is mounted between first and second cross polarizers with said first polarizer being between said body and a light source and said second polarizer being between said body and light responsive means, means for producing a light output scanning in a predetermined pattern comprising, first and second electrodes mounted in parallel spaced relationship on a face of said body normal to the direction in which light is propagated through said system, said spaced parallel electrodes extending on said one face in a configuration conforming to the desired scanning pattern, and means coupled to said electrodes for applying therebetween a pulse effective to propagate between said electrodes from one end of said electrodes to the other end thereof.

19. An electro-optical device comprising a body of electro-optically active material, means for applying polarized light to a surface of said material, means for selectively applying a first electric signal having a first frequency to said material, means for selectively applying a second electric signal having a second frequency to said material, means for detecting polarized light passing through said material at the frequencies of said first signal, said second signal, the sum of said first and second signals and the difference between said first and second signals, an output terminal, and means coupling said light detecting means to said terminal for preventing the passage to said terminal of signals of said first frequency and of said second frequency.

20. An electro-optical device comprising a body of electro-optically active material, means for applying polarized light to a surface of said material, means for selectively applying a first electric signal having a first frequency to said material, means for selectively applying a second electric signal having a second frequency to said material, means for detecting polarized light passing through said material at the frequencies of said first signal, said second signal, the sum of said first and second signals and the difference between said first and second signals and means coupled to said light detecting means responsive only to a signal produced by the interaction of said first and second signals.

21. An electro-optical device as set forth in claim 20 wherein said body of material comprises barium titanate maintained at a temperature above its Curie temperature.

22. An electro-optical device comprising a body of electro-optically active material, means for applying polarized light to a surface of said material, means for selectively applying a first electric signal having a first frequency to a first plurality of groups of points in said material, means for selectively applying a second electric signal having a second frequency to a second plurality of groups of points in said material, each group of said second plurality of groups including at least one point of each of said first plurality of groups of said points, means for detecting polarized light passing through said material at the frequencies of said first signal, said second signal, the sum of said first and second signals and the difference between said first and second signals, a record having opaque and transparent areas therein to light passing through said material, an output terminal and means coupling said light detecting means to said terminal for preventing the passage to said terminal of signals of said first frequency and of said second frequency.

23. An electro-optical device comprising a plurality of light modulating elements, each of said elements comprising a body of electro-optically active material, means for applying polarized light to a surface of each of said elements, means for selectively applying a first electric signal having a first frequency to a first plurality of groups of said elements, means for selectively applying a second electric signal having a second frequency to a second plurality of groups of said elements each group of said second plurality of groups including at least one element of each of said first plurality of groups of said elements, means for detecting polarized light passing through said modulating elements at frequencies produced by the interaction of said first and second signals, a record having opaque and transparent areas therein to light passing through said light modulating elements and means coupled to said light detecting means responsive only to signals produced by the interaction of said first and second signals.

24. A logic circuit comprising a source of light producing polarized light in a given plane, a polarizer oriented so as to have a direction of acceptance substantially 90 degrees with respect to said given plane, a light modulating element including a crystal serially positioned between said source and said polarizer, said crystal being voltage responsive so as to rotate the plane of polarized light passing therethrough to produce maximum and minimum values of light at the output of said polarizer at predetermined values of voltage applied thereto, means for selectively applying to said crystal a first voltage having a magnitude capable of rotating the plane of polarized light at least 90 degrees, means for selectively applying to said crystal a second voltage having a magnitude capable of rotating the plane of polarized light at least 90 degrees, said first and second voltages producing one of said values of light at the output of said polarizer when applied coincidently to said crystal, and means for detecting the light passing through said polarizer.

References Cited in the file of this patent

UNITED STATES PATENTS

| | | |
|---|---|---|
| 1,808,137 | Hartley | June 2, 1931 |
| 2,254,022 | Whitaker | Aug. 26, 1941 |
| 2,301,743 | Nagy et al. | Nov. 10, 1942 |
| 2,385,086 | D'Agostino et al. | Sept. 18, 1945 |
| 2,482,242 | Brustman | Sept. 20, 1949 |
| 2,528,510 | Goldmark | Nov. 7, 1950 |
| 2,600,817 | Victoreen | June 17, 1952 |
| 2,616,962 | Jaffe | Nov. 4, 1952 |
| 2,670,402 | Marks | Feb. 23, 1954 |
| 2,755,996 | Williams et al. | July 24, 1956 |
| 2,768,557 | Bond | Oct. 30, 1956 |
| 2,780,958 | Wiley | Feb. 12, 1957 |